MANSFIELD & THISTLE.
Attaching Hubs to Axles.
No. 5,109. Patented May 8, 1847.
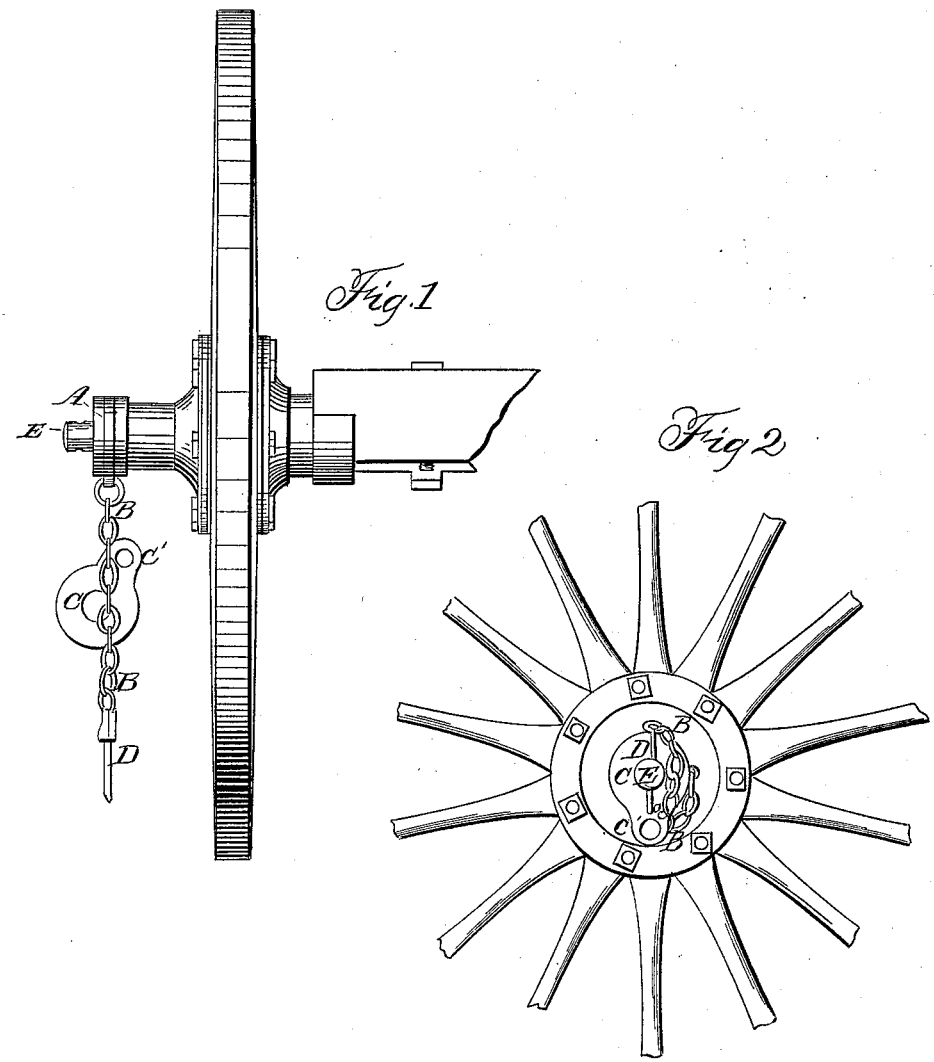

UNITED STATES PATENT OFFICE.

WARREN MANSFIELD, OF SOUTH BRAINTREE, MASSACHUSETTS, AND H. L. THISTLE, OF WASHINGTON, DISTRICT OF COLUMBIA.

LINCHPIN AND WASHER.

Specification of Letters Patent No. 5,109, dated May 8, 1847.

*To all whom it may concern:*

Be it known that we, WARREN MANSFIELD, of South Braintree, in the State of Massachusetts, and H. L. THISTLE, of the city of Washington, in the District of Columbia, have invented a new and useful Improvement in the manner of arranging and combining linchpins and washers with the wheels and axles of army and other wagons and carriages; and we do hereby declare that the following is a full and exact description thereof.

It is well known to persons acquainted with the manner of constructing wagons for the use of the army, that the using of linch pins and washers for keeping the wheels on the axles is universally preferred to the employment of screws and nuts for the same purpose; but much inconvenience and delay have resulted from the accidental removal of linch pins, and their frequent loss, as well as that of the washers, thereby admitting of the coming off of the wheels.

In the accompanying drawings we have represented our improved manner of arranging and combining the linch-pin, washer, and axle, by which all the inconveniences heretofore complained of, are obviated.

Figure 1, is a side view of the wheel, with a part of the axle, having our linch pin and washer attached to the hub, or nave, ot the wheel; but these are represented in this figure as removed from the axle. Fig. 2, is a view of a part of the face of a wheel, with the end of the axle, the washer and linch pin being in place.

A, Fig. 1, is a ring which swivels around freely in a groove, made for that purpose near the outer end of the hub to receive it; and through an eye on this ring passes a link of the chain B, B. To this chain is attached the washer C, a link of it passing a hole in it as at *a*, Fig. 2.

D, is the linch pin, which is attached to the outer end of the chain B.

E, is the outer end of the axle which does not differ from those in ordinary use.

The washer C, is not made a perfect circle, but has on one side of it a projecting part C', close to which the chain B, is attached to it, the weight of which will always keep this part of it downward, and the length of that part of the chain to which the linch pin D, is attached, is not such as will allow of the removal of the linch pin, without first turning the part C' of the washer toward the top; there is not the slightest danger therefore of its getting out of place, excepting it be removed by design.

Having thus fully described the nature of our improvement in the manner of arranging and combining linch pins, and washers, with the wheels and axles of army and other wagons, and shown the operation thereof, what we claim as new therein and desire to secure by Letters Patent is—

The attaching of the washer and linch pin by means of a chain to a swivelling ring on the hub of the wheel, the attachment being made in the manner set forth, so that for the removal of the linch pin, said washer will have to be turned around in the manner described, the whole combination and arrangement being substantially the same with that herein fully made known.

WARREN MANSFIELD.
H. L. THISTLE.

Witnesses:
THOS. P. JONES,
EDWIN L. BRUNDAGE.